(12) United States Patent
Hellhake et al.

(10) Patent No.: US 9,001,645 B2
(45) Date of Patent: Apr. 7, 2015

(54) SYSTEM AND METHOD FOR PACKET DELIVERY BACKTRACKING

(71) Applicant: Rajant Corporation, Malvern, PA (US)

(72) Inventors: Paul R. Hellhake, Downingtown, PA (US); Martin A. Lamb, Romansville, PA (US); Joseph E. Parks, Coatesville, PA (US); David Acker, Malvern, PA (US)

(73) Assignee: Rajant Corporation, Malvern, PA (US)

( * ) Notice: Subject to any disclaimer, the term of this patent is extended or adjusted under 35 U.S.C. 154(b) by 118 days.

(21) Appl. No.: 13/708,433

(22) Filed: Dec. 7, 2012

(65) Prior Publication Data

US 2013/0128726 A1 May 23, 2013

Related U.S. Application Data

(63) Continuation-in-part of application No. 11/435,287, filed on May 17, 2006, now Pat. No. 8,341,289.

(51) Int. Cl.

| | |
|---|---|
| *H04W 40/02* | (2009.01) |
| *H04L 29/12* | (2006.01) |
| *H04W 40/26* | (2009.01) |
| *H04W 40/38* | (2009.01) |
| *H04L 12/721* | (2013.01) |
| *H04B 1/00* | (2006.01) |
| *H04W 28/04* | (2009.01) |
| *H04W 28/18* | (2009.01) |
| *H04W 72/00* | (2009.01) |
| *H04W 76/04* | (2009.01) |

(Continued)

(52) U.S. Cl.
CPC ............ *H04W 40/02* (2013.01); *H04L 61/2061*
(2013.01); *H04L 61/25* (2013.01); *H04L 29/12283* (2013.01); *H04L 29/1233* (2013.01); *H04W 40/26* (2013.01); *H04W 40/38* (2013.01); *H04L 45/36* (2013.01); *H04L 61/2015* (2013.01); *H04B 1/00* (2013.01); *H04W 28/04* (2013.01); *H04W 28/18* (2013.01); *H04W 72/00* (2013.01); *H04W 76/04* (2013.01); *H04W 80/00* (2013.01); *H04W 84/18* (2013.01); *H04W 88/04* (2013.01); *H04L 45/66* (2013.01); *H04L 45/48* (2013.01); *H04L 2001/0097* (2013.01)

(58) Field of Classification Search
CPC ......... H04L 45/22; H04L 45/28; H04L 45/00; H04L 29/14; H04L 12/2422
USPC .................................. 370/238, 255, 338, 351
See application file for complete search history.

(56) References Cited

U.S. PATENT DOCUMENTS

| | | | |
|---|---|---|---|
| 5,920,699 A * | 7/1999 | Bare .............................. | 709/225 |
| 6,421,731 B1 * | 7/2002 | Ciotti et al. ................... | 709/238 |

(Continued)

OTHER PUBLICATIONS

RFC 1771, A Border Gateway Protocol 4, Mar. 1995.*

*Primary Examiner* — Melvin Marcelo
*Assistant Examiner* — Peter Solinsky
(74) *Attorney, Agent, or Firm* — Blank Rome LLP (57) ABSTRACT

Traditional computer networks have been designed with the need for highly reliable packet delivery. This is largely handled by a centrally managed simple send-acknowledge protocol. In a highly dynamic mesh network, these methods are inadequate to ensure the most reliable packet delivery. This invention uses the natural redundancy of routes in a mesh and other techniques to increase the reliability of a network, even as the paths to any given node are dynamic in nature.

14 Claims, 7 Drawing Sheets

(51) Int. Cl.
*H04W 80/00* (2009.01)
*H04W 84/18* (2009.01)
*H04W 88/04* (2009.01)
*H04L 12/753* (2013.01)
*H04L 1/00* (2006.01)

(56) References Cited

U.S. PATENT DOCUMENTS

| | | |
|---|---|---|
| 6,917,985 B2 | 7/2005 | Madruga et al. |
| 6,961,310 B2 | 11/2005 | Cain |
| 7,054,747 B2 | 5/2006 | Ruelke et al. |
| 7,167,715 B2 | 1/2007 | Stanforth |
| 7,263,379 B1 | 8/2007 | Parkulo et al. |
| 7,272,662 B2 * | 9/2007 | Chesnais et al. ............. 709/246 |
| 7,274,697 B2 * | 9/2007 | Ji et al. ............................ 370/392 |
| 7,430,164 B2 * | 9/2008 | Bare .............................. 370/217 |
| 7,486,672 B2 * | 2/2009 | Wybenga et al. ............. 370/389 |
| 7,577,131 B2 * | 8/2009 | Joseph et al. .................. 370/351 |
| 8,341,289 B2 * | 12/2012 | Hellhake et al. ............... 709/238 |
| 8,429,295 B2 * | 4/2013 | Vaswani et al. ................ 709/242 |
| 8,437,255 B2 * | 5/2013 | Jiang .............................. 370/232 |
| 8,689,316 B2 * | 4/2014 | Mao et al. ........................ 726/13 |
| 2005/0157749 A1 | 7/2005 | Lee et al. |
| 2005/0265256 A1 | 12/2005 | Delaney |
| 2005/0282494 A1 | 12/2005 | Kossi et al. |
| 2005/0286246 A1 | 12/2005 | Coon et al. |
| 2005/0286464 A1 | 12/2005 | Saadawi et al. |
| 2006/0176829 A1 * | 8/2006 | McLaughlin et al. ......... 370/252 |
| 2006/0198508 A1 * | 9/2006 | Delaney et al. ........... 379/221.12 |
| 2010/0189113 A1 * | 7/2010 | Csaszar et al. ................. 370/400 |
| 2011/0286326 A1 * | 11/2011 | Awano ........................... 370/225 |
| 2013/0094363 A1 * | 4/2013 | Duan ............................ 370/235 |
| 2013/0100839 A1 * | 4/2013 | Arora et al. .................... 370/252 |
| 2013/0254426 A1 * | 9/2013 | Vaswani et al. ................ 709/242 |
| 2014/0003225 A1 * | 1/2014 | Mann et al. ..................... 370/216 |
| 2014/0065998 A1 * | 3/2014 | Dhomeja ..................... 455/404.1 |
| 2014/0115319 A1 * | 4/2014 | May .............................. 713/150 |

* cited by examiner

Prior Art

SYSTEM AND METHOD FOR PACKET DELIVERY BACKTRACKING

REFERENCE TO RELATED APPLICATION

The present application is a continuation-in-part of U.S. patent application Ser. No. 11/435,287, filed May 17, 2006, currently pending, which claims the benefit of U.S. Provisional Patent Application No. 61/681,464, filed May 15, 2005. The disclosures of the above applications are hereby incorporated by reference in their entireties into the present application.

FIELD OF THE INVENTION

The present invention concerns tactical and other highly mobile communications networks. Such networks are distinguished by their ability to self-organize and heal connections, as radio nodes enter and leave each others' direct communications ranges with minimal impact to the performance of other nodes on the network.

DISCUSSION OF THE KNOWN ART

A wireless communication network typically includes a wireless client device or station (STA) that communicates with one or more access points (APs) that are connected to a communications infrastructure. The communications infrastructure typically consists of routing nodes which facilitate the movement of message packets through wired or wireless network connections. In a typical wireless infrastructure system, a STA may roam within the network by association and disassociating with multiple APs. However, typically APs and the associated network topology remain stationary and static.

Figure 6:
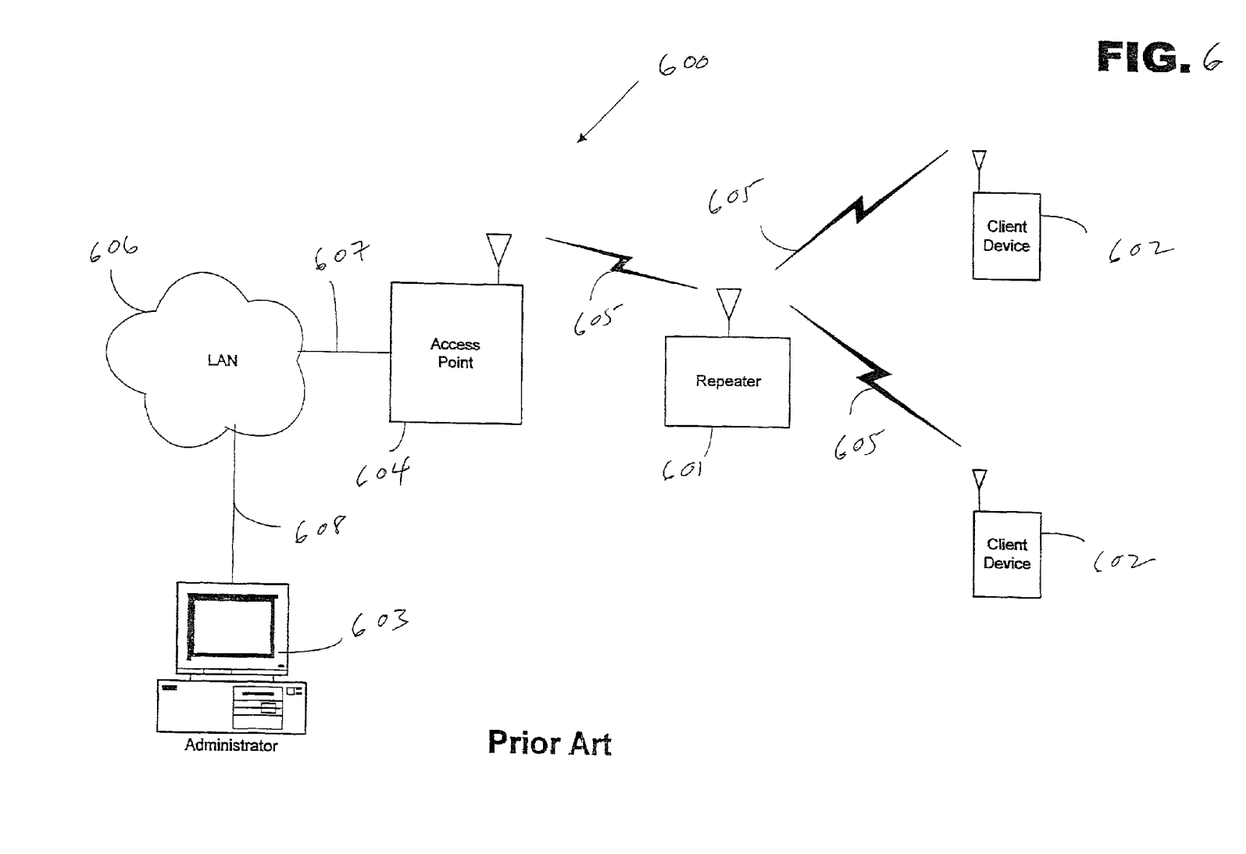
FIG. 6 is a schematic diagram showing a conventional wireless system.

FIG. 6 is a schematic diagram illustrating a conventional wireless system. The wireless network 600, in pertinent part, includes a repeater device 601 wirelessly connected via communication links 605 between two client devices 602 and an access point 604. The access point 604 is also connected through a wired network connection 607 to the LAN 606. Additionally, an administrator 603 communicates with the wireless network through the LAN 606 via the wired network connection 608. In FIG. 6, the wireless network 600 is extended using the repeater device 601. However, the repeater device 601 will effectively halve the potential bandwidth if it is sending and receiving on the same channel. Therefore, uninterrupted data streams passing both in and out of a repeater can only use, at most, half the available bandwidth on the channel.

Another type of wireless network, known as a mobile ad hoc network (MANET) enables the routing nodes to move and form a dynamic autonomous network with an arbitrary topology. In this type of wireless network, a STA may also function as a routing node and not be required to associate with an AP. A MANET is also referred to as a "multi-hop network" because multiple wireless transmission hops may be necessary to forward message packets between nodes in the network.

MANETs are attractive because they provide instant network formation without the need for connection planning and routing node administration. The result is ease of deployment, speed of deployment, and decreased dependence on a fixed infrastructure. However, a MANET must overcome numerous obstacles to effective communications. For example, nodes are mobile and connected dynamically in an arbitrary manner based on the proximity of one node to another and are therefore subject to frequent disconnection. Wireless links have significantly lower capacity than wired links because they are affected by additional error sources that result in degradation of the received signal and high bit error rates. Mobile nodes may rely on battery power and therefore be energy constrained. Mobile nodes are more autonomous and less capable of centralized administration. The mobile nodes in a network must share common radio frequencies and are therefore prone to greater interference from each neighboring node.

One important network component is its routing protocol. The routing protocol is the mechanism by which message packets are directed and transported through the network from the message source to its destination. An important routing protocol objective is to maximize network performance while minimizing the cost of the network itself in accordance with its capacity. Dynamic connections and the arbitrary manner in which nodes are connected in a MANET create a challenge to the routing method. Factors which impact the ability of the routing protocol to accomplish its objectives include hop count, delay, throughput, loss rate, stability, jitter, density, frequency of communications, and frequency of topology changes (mobility rate).

The routing protocol must also guard against message packet duplication and communication loops. For example, if two network nodes, A and B, were to retransmit every message packet they received; A would first send a message packet to B which would then retransmit it back to A, and so on. Any new message packets introduced into the network would also loop and eventually the network would be completely saturated with continuously looping message packets. Loop prevention methods such as Spanning Tree Protocol (STP), as described by IEEE 802.1d, address this problem while allowing for path redundancy.

However, STP and its variants, such as Rapid Spanning Tree Protocol and Multiple Spanning Trees Protocol, do not perform well in networks where the quality or availability of connections between routing nodes is dynamic and subject to frequent change. For example, STP relies upon a root node to organize and create a logical tree that spans all of the nodes in the network with only one active path. This routing pathway information is disseminated from the root node to all other routing nodes. Any changes to the network topology, including changes in link quality and the addition or subtraction of a pathway or network node must be organized by the root node and a new logical tree created and disseminated to all routing nodes. Because of this, STP and other protocols which rely upon root node techniques do not perform well in dynamic network environments and can cause network reliability issues due to unacceptable periods of interrupted communications while the network routing is rediscovered and disseminated to all routing nodes.

In order for a routing node to forward a message packet, the routing protocol must know the network address of the next network node in the message packet's path. Network addresses can either be explicitly stated in the header or wrapper of the message packet, or predetermined and maintained in a table by each routing node. In the former, called source routing, there is no need to maintain a table at every routing node because every packet contains the address of every network node the packet needs to traverse. In the latter, called table-driven routing, the next routing node address is taken from a table based on the packet destination address and other criteria defined by a routing protocol. In table-driven routing, such as Optimized Link State Protocol (OLSR) and Wireless Routing Protocol (WRP), each routing node must continuously evaluate and maintain information on routes to every other node in the network and periodically exchange this information with other routing nodes.

Some MANET routing protocols include variations for on-demand routing using reactive mechanisms, where routes are found when they are needed and thus reduce the amount of overhead traffic by avoiding the need to frequently exchange state information. Additionally, there are other hybrid, hierarchical, and location-based protocols that have been proposed. Two of the better known MANET protocols are Ad hoc On-Demand Distance Vector Routing (AODV) and Dynamic Source routing (DSR). AODV is based on a distance vector routing method and uses a route table to find the next network node in the route. However, the AODV protocol assumes that each link is symmetric and is not well adapted to networks having asymmetric pathways between routing nodes. DSR is based on a source routing method and while supporting asymmetric pathways between routing nodes, it imposes the overhead of communicating the entire route map with every message packet.

SUMMARY OF THE INVENTION

An improved set of methods for delivering packets, suitable for highly mobile, highly volatile, mesh networks is described herein. The invention is an improvement on existing methods of mesh network packet routing, to maximize the chance of transmission success. The network consists of network device node (referred to as simply "a node") including at least one transceiver and a processor that implements a data communications protocol to communicate data to other network devices in an ad-hoc network. The data sent is divided into data packets (referred to as simply "a packet"), with each data packet being encoded with a protocol header that includes that packet's source address, destination, cost information, and data flags that indicate the type and other attributes of any given packet.

The advancement in the art entailed in this invention comprises a series of procedures designed to ensure the delivery of a packet from a transmitting node to a receiving node, even as both nodes are dynamically moving around a network. This is implemented as improvements to the routing in the ad-hoc mesh network, in which each node may store in a bridge table not only the preferred route to a destination node, but also an optional auxiliary route to that node. This is joined by a "discovery" mode, in which a data unicast is converted to a data broadcast designed to help find the route to a destination once the known routes are exhausted. A successful discovery results in an introduction/acknowledge packet being sent back to the sender, which updates the routes to the destination node in the bridge tables of all nodes in the path from source to destination, as well as acknowledging a successful delivery.

The invention is an improvement on existing methods of mesh network packet routing, to maximize the chance of transmission success. The network includes a network device node (referred to as simply "a node") including at least one transceiver and a processor that implements a data communications protocol to communicate data to other network devices in an ad-hoc network. The data sent is divided into data packets (referred to as simply "a packet"), with each data packet being encoded with a protocol header that includes that packet's source address, destination, cost information, and data flags that indicate the type and other attributes of any given packet.

In the network implementation, a module known as the bridge handler is the part that computes the routing of a packet. A packet may be an encapsulated packet, which is a packet identified as a mesh packet. To send such a packet out of the mesh network (to deliver to a client, for example), the packet must be changed to an unencapsulated packet. Conversely, packets sent over network media from outside of the mesh network must be encapsulated to be sent through the mesh. A packet is normally considered deliverable, but once the normal delivery mechanisms fail, it will be flagged as undeliverable.

BRIEF DESCRIPTION OF THE DRAWINGS

A preferred embodiment of the present invention will be set forth in detail with reference to the drawings, in which.

DETAILED DESCRIPTION OF THE PREFERRED EMBODIMENT

A preferred embodiment of the present invention will be set forth in detail with reference to the drawings, in which like reference numerals refer to like elements or steps throughout.

Figure 1:
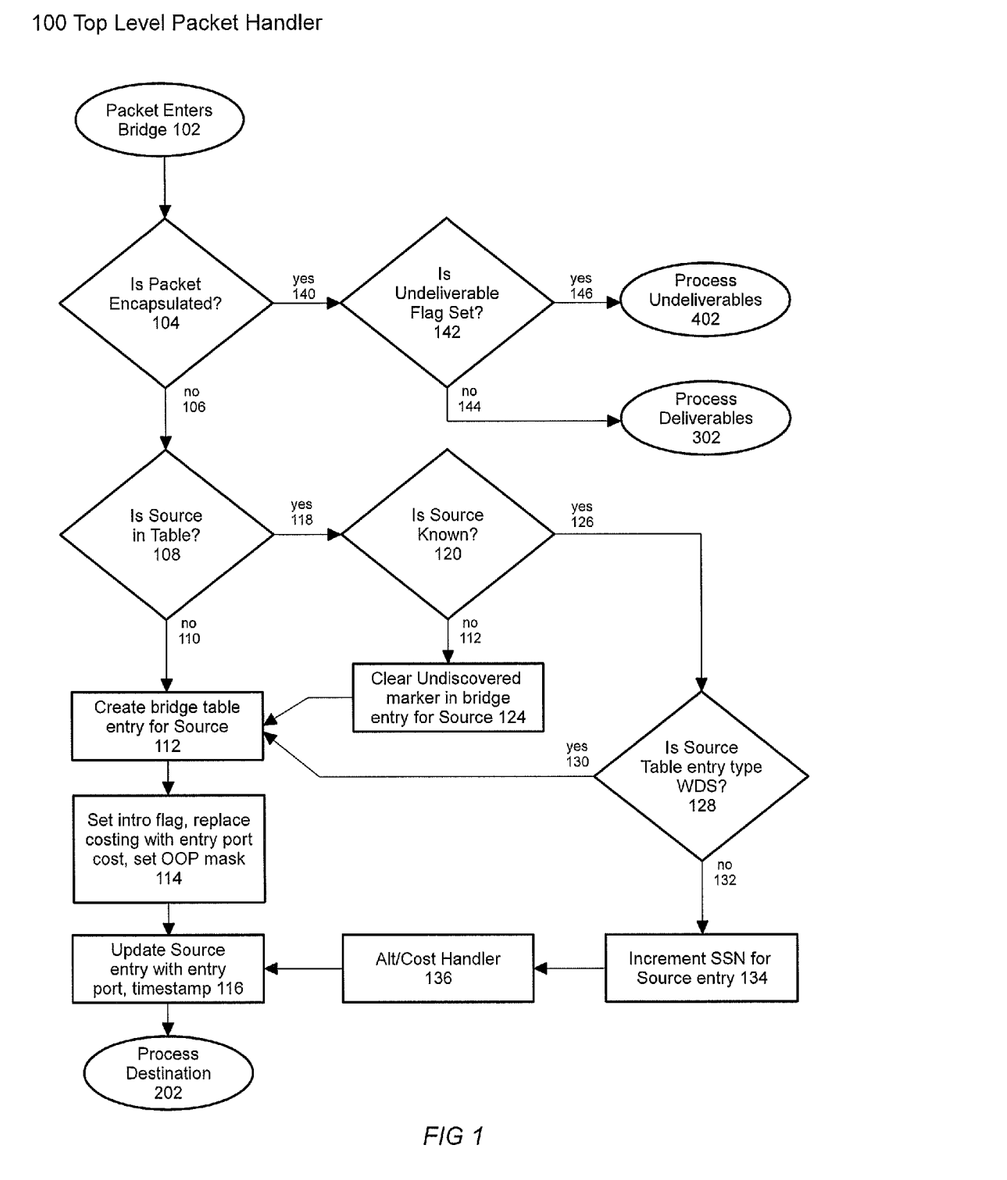
FIG. 1 is a flow chart showing the top level of the bridge logic.

FIG. 1 illustrates the top level of the Bridge Handler 100. A packet enters this handler 102 and is then checked for encapsulation 104. If the packet is not encapsulated 106, its source is checked in the bridge table 108. If the source is not known 110, an entry for it is created in the bridge table 112, a random sequence number is added 113, default settings are applied to that table entry 114, and the entry is timestamped 116 and delivered to its destination 202.

If the source is already in the table 108, 118, it is checked for whether it was previously known 120. If it is known 122, the Undiscovered flag is cleared 124, sequence number applied 113, flags initialized 114, timestamped 116, and the packet is delivered 202. If the source was known, a check is done 128 for whether it is a for a WDS (mesh) port 130 or not. If so, it is processed normally. If not 132, the sequence id is incremented 134, costing is applied 136, the packet is timestamped 116, and delivered 202.

If the packet is already encapsulated 104, 140, it is checked for the undeliverable flag 142. If marked as undeliverable 146, this is sent to the Process Undeliverables module 402. If deliverable, this is sent to the Process Deliverables modules 302.

Figure 2:
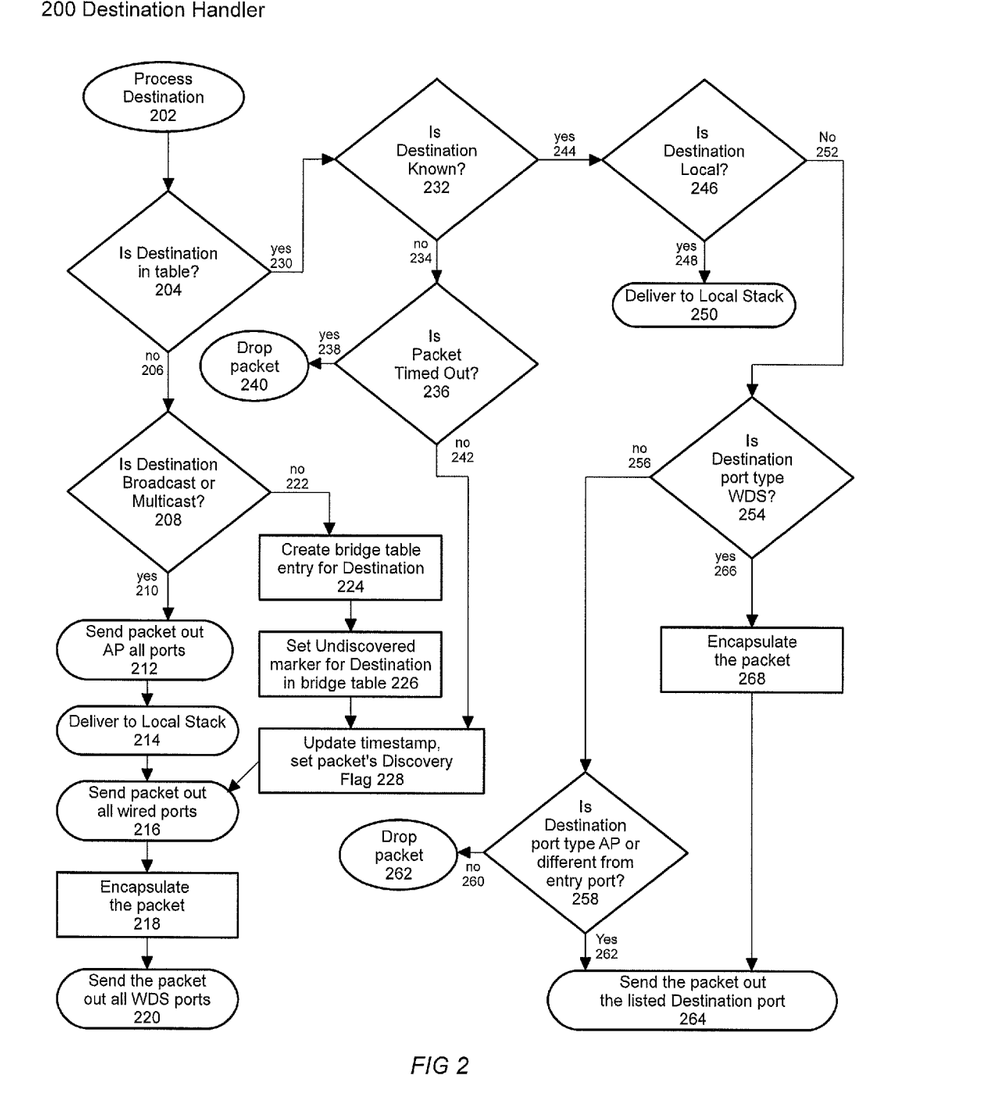
FIG. 2 is a flow chart showing the destination handler logic.

FIG. 2 illustrates the Destination Handler 200, the packet starts at the Process Destination 202 point, with a check for whether the packet's destination is in the bridge table 204. If the destination is not known 206, the packet is checked 208 as a multicast or broadcast packet. Broadcast/multicast packets are sent everywhere; they do not have a conventional destination. If the packet is broadcast or multicast 210, the packet is sent everywhere other than the original source. First this is sent to all wireless (access point) ports 212, delivered to the local networking stack 214, then sent out all wired local ports 216. Finally, the packet is encapsulated 218, and sent to all WDS (mesh) ports 220.

If the packet is not multicast 208, 222, a bridge table entry is created for the new Destination 224, the packet is set as Undiscovered 226, timestamped and set with Discovery Flag. This is then sent out all wired local connections 216, encapsulated 218, then sent to all WDS ports (eg, the packet is broadcast)

If the Destination is in the table 204, 230, then we check if the packet's destination is known 232. If the destination is unknown 234, it is checked for timeout 236. If the packet has timed out 238, it is simply dropped 240. If it has not timed out 242, the packet's timestamp is updated, it is flagged as a discovery packet 228, sent to all wired ports 216, encapsulated 218, and broadcast to all mesh ports 220.

If the destination is, in fact, known 232, 244, it is checked as a local destination, e.g., is this packet for this local node and clients 246? If the packet is for the local node 248, it is delivered to the local networking stack 250. If not, the packet's destination is checked as a WDS port time, a mesh port 254. If it is a mesh port 266, the packet is encapsulated 268, then sent out via the destination route from the bridge table 264. If the destination is not on the mesh 256, the destination port type is checked 258. If this is a different port type than its arrival port 262, it is sent to that port 264. Otherwise 260, the packet is dropped 262.

Figure 3:
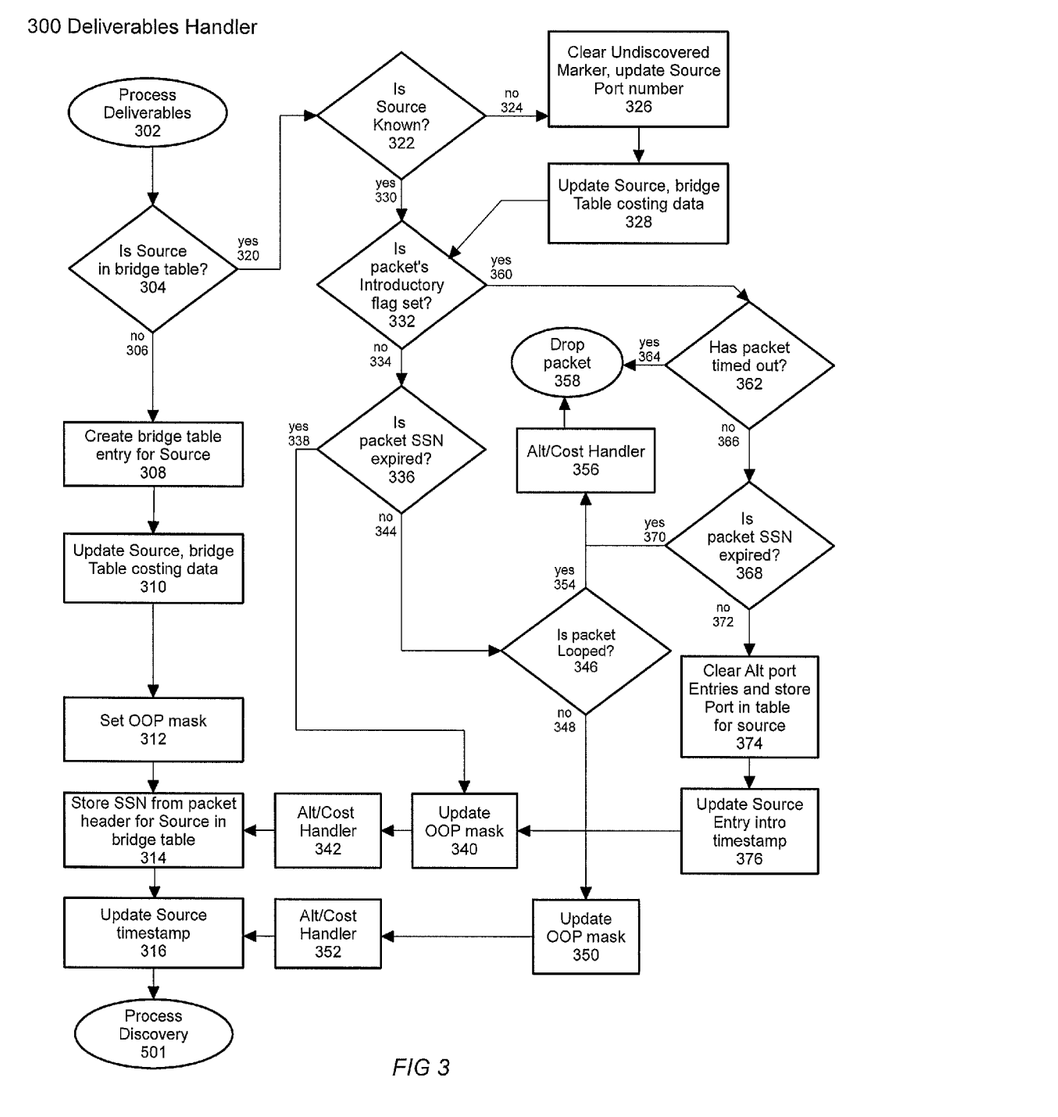
FIG. 3 is a flow chart showing the deliverables handler logic.

The handing of normal, assumed deliverable packets is shown in FIG. 3, the Deliverables Handler 300. A packet here is immediately checked for its source being found in the bridge table 304. If the Source is not in the bridge table 306, an entry is created 308, the basic defaults are applied to that entry 310, loop mask 312 and sequence number 314 are updated, a timestamp is applied, and the packet is sent to the Discovery process 501.

If the source is in the bridge table 304, 320, it is necessary to check if the source is known 322. If the source is unknown in the bridge table 324, source data from the packet needs to update the bridge table. In the table, the undiscovered marker for the Source is cleared, the table is updated with the Source port 326 and costing data 328. In either case 322, the next check is for the packet's Introductory flag 332. This is sent when a new or re-established node is introducing itself to other nodes. If this is not an Introduction packet 334, the sequence number is checked 336. If the table's sequence number is older than the packet's 338, there is no loop potential. The loop mask is updated 340, cost analysis run 342, bridge table updated with the current packet sequence 314, timestamps updated 316, and the discovery process run 501. When the table's sequence number is not old 336, 344, the packet is checked for looping 346. If not looped 348, the loop mask is updated 350, costs analyzed 352, timestamped 316, and sent to the Discovery handler 501. If the packet is looped 354, the cost analysis is done 356, and the packet is dropped 358.

When the packet's introductory flag is set 332, 360, it is necessary to check for a packet timeout 362. If the packet has timed out 364, the packet is dropped 358. If the packet is not timed out, we check if the sequence number has expired 368. If so, the cost analysis is run 356, then the packet dropped 358. Otherwise, the packet's source data is used to update the routing in the bridge table 374, timestamp updated 376, loop mask updated 340, cost analysis run 342, then sequence 314 and timestamp 316 updated in the bridge table for the source, and the Discovery Process run 501.

Figure 4:
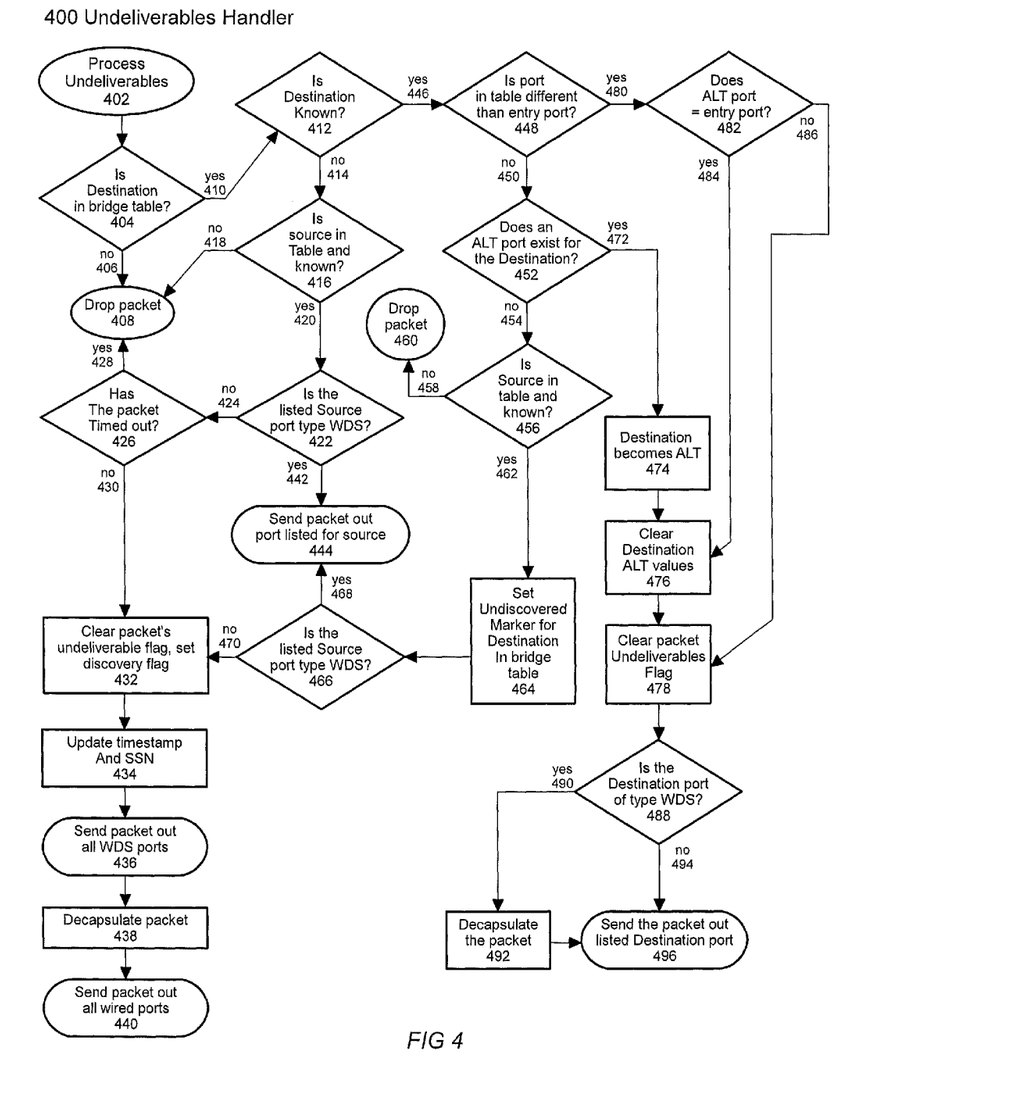
FIG. 4 is a flow chart showing the undeliverables handler logic.

FIG. 4 illustrates the Undeliverables Handler 400. Starting 402 at the first decision, is the packet's Destination in the bridge table 404? If not 406, the packet is dropped immediately 408. If the Destination is in the bridge table 410, is it known 412? If not 414, is the Source in the bridge table and known 416? If not, simply drop the packet 408. If the Source is known 420 and if it is a WDS (mesh) port type 442, the packet is easily backtracked, sent back to the Source 444.

If the Source is not a mesh port 422, 424, we check for timeout 426. If it is timed out 428, the packet is dropped 408. If not 430, the packet is changed from Undeliverable to Discovery 432. Timestamp and sequence number are updated (sequence is always updated when changing a packet to a Discovery type) 434. This Discovery packet is then broadcast to all mesh ports 436, decapsulated 438 and sent to all local wired ports 440, in an effort to find the missing destination node.

If the Destination is known in the table 412, 446, it is checked against the entry port 448. If they are the same 450, the table is checked for an alternate route for the Destination 452. If there is no alternate port 454, the table is checked for a known Source 456. If the Source is not known 458, the packet is dropped 460. If the Source is known 456, 462, a backtrack starts. The Destination in the bridge table is updated as Undiscovered 464, and the Source type is checked 466. If the Source port is a mesh port 468, the packet is simply sent back to the source 444. If not, the packet is changed to a discovery packet 432, updated with a new timestamp and sequence number 434, broadcast to all mesh ports 436, decapsulated 438, and then broadcast to all wired ports 440 (typical client broadcast means; the actual broadcast mechanism is chosen by other components of the system).

If there is an alternate port 452, 472, the Destination is changed to the alternate 474 and then the alternate settings cleared 476. The packet is cleared of Undeliverable status, decapsulated 492 if the new Destination port is not a WDS type 488, 490, and then sent to the new Destination port 496.

If the table port is the different than the entry port 480, the entry port is checked against the alternate port 482. If they're the same 484, then it is the alternate port that's a problem, so the Destination's alternate port information is cleared 476. In both cases 486, the packet's undeliverable Flag is cleared 478, the packet decapsulated 492 if the Destination is not a WDS port 488, and finally sent to the Destination port 496.

Figure 5:
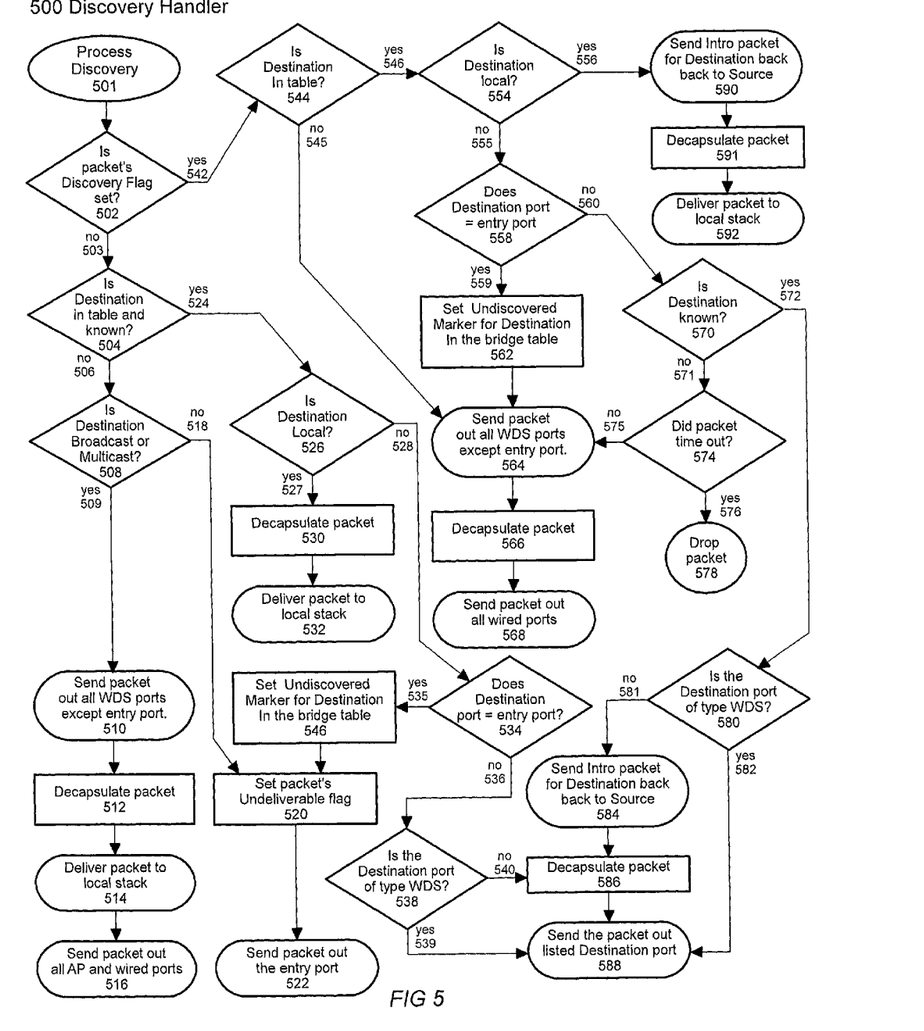
FIG. 5 is a flow chart showing the discovery handler logic.

The Discovery Handler 500 is shown in FIG. 5. A packet is sent to this part of the process 501, and immediately checked for a Discovery Flag 502. If the Discovery Flag is not set 503, the bridge table is checked for the Destination being known 504. If this is a multicast or broadcast packet 508, 509, the packet is sent out all WDS ports other than the originator 510, decapsulated 512, then delivered to the local networking stack 514 and on to all Access Point and wired ports on the local node. If it is not a broadcast packet 508, 518, the packet is marked Undeliverable and backtracked, eg, sent back to the entry port 522.

When the Destination table is known 504, 524, the packet is checked for a local destination 526 (a packet for the current node or something out of mesh attached to that node via wired networks or an access point). If the packet is local 527, the packet is decapsulated 530 and delivered to the local device's network stack 532. If the packet is not local, we check if the Destination port is the entry port 534. If so, the Destination is marked Undiscovered in the Bridge table 546, the packet is set to Undeliverable 520, and it is backtracked out the entry port 522. If the Destination port is not the entry port 534, 536, the type of Destination is checked 538. If the Destination port is not a WDS port 540, the packet is decapsulated 586. Then the packet is sent out the listed Destination port 588.

When the packet is a Discovery packet 502, 542, the Destination is checked in the bridge table 544. If it is unknown 545, it is simply rebroadcast via all WDS ports other than the entry port 564, decapsulated 566, then broadcast out via all wired ports 568. If the Destination is in the table 546, we check to see if the Destination is local 554. If so, this is a Discovery packet looking for this node. An Introduction packet is sent back to the Source node 590, the Discovery packet is decapsulated 591, and then delivered to the targeted local resource via the local networking stack 592.

When the Destination is in table but not local 554, 555, the Destination port is checked against the entry port 558. If they match 559, this indicates a failed attempt to find a Destination once known to this node. The bridge table is updated to mark this Destination Undiscovered 562. The Discovery packet is then broadcast on all ports other than the entry port 564, decapsulated 566, and broadcast to all local wired ports 568. If the Destination port does not match the entry port 558, 560, the bridge table is checked for the Destination 570. If the Destination is not known 571, the packet is checked for timeout 574. If it is timed out, the packet is dropped 578. Otherwise, the packet is rebroadcast to all WDS ports other than the entry 564, decapsulated 566, and sent to all wired local ports.

If the Destination is known 570, 573, the type of Destination port is checked 580. If the port is WDS 582, the packet is sent to the Destination port 588. If not, an Introduction packet for the Destination is sent back to the Source 584, the packet is decapsulated, and then sent to the Destination 588.

Figure 7:
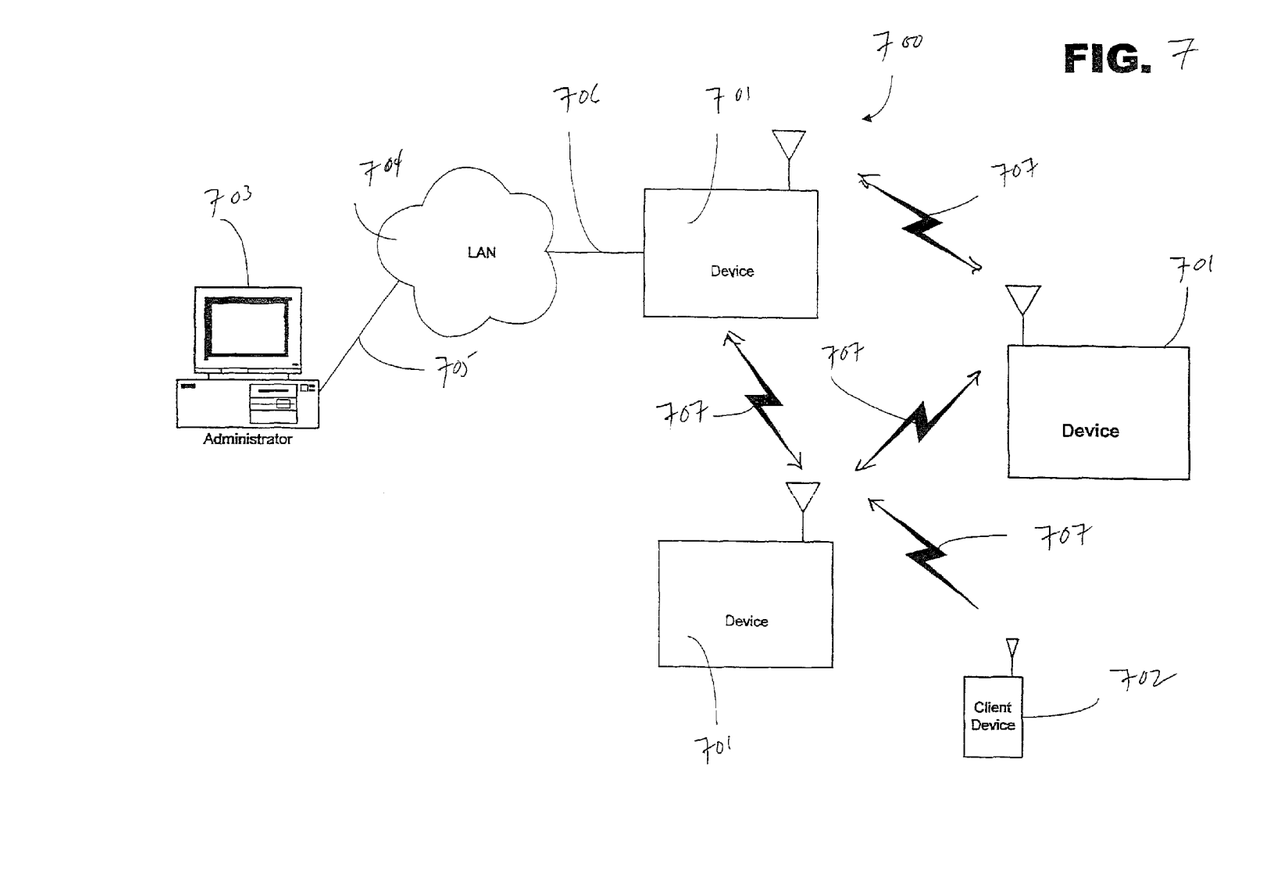
FIG. 7 is a schematic diagram showing a wireless system on which the preferred embodiment can be implemented.

Hardware on which the preferred or another embodiment can be implemented will now be described with reference to FIG. 7, which is schematic diagram illustrating a wireless mobile ad-hoc network 700. In accordance with one example of a preferred embodiment, the wireless network 700 includes several wireless network node devices 701 communicating wirelessly over a communication link 707. Each communication link 707 utilized by the node device 701 includes at least one channel that conforms to the IEEE 802.11b, 802.11a, 802.11g or other standard as a forward and backward link for communicating with other node devices 701 in the network 700. Each node device 701 includes at least one transceiver, a processor module, a memory module and control software logically connected to select and configure at least one transceiver for establishing and maintaining a communications link with other devices on the network 700 by scanning and selecting a channel from a pool of available channels.

The network preferably provides a mesh architecture with a protocol that transparently recovers from node failures, jamming, and traffic congestion. The network preferably does not rely on base stations, root nodes or any central routing control authority, and therefore does not require constant communication with any given network component for proper operation.

At least one of the channels in the communication link 707 used by a node device 701 may be configured for communication with a client device 702. At least one node device 701 is configured as a gateway or bridge to the wired network 704 via a wired network connection 706. To that end, each node device 701 can operate as an access point for client devices, a wired bridge to client devices, a wireless bridge to other node devices, a wired bridge to an Ethernet network, a gateway to other wireless networks, and a gateway to a wired Ethernet network.

The administrator 703 can communicate with the wireless network 700 via the LAN 704 and wired connection 705. The administrator can be a PC or the like that is capable of graphically illustrating a topology of the wireless network 700 as well as monitoring and controlling network devices. However, the administrator 703 is not limited to use with a wired connection 705, and is adaptable to communicate with the network 700 via a wireless connection that is compatible with the transceiver standards of the node device 701.

In an embodiment, a mesh architecture permits automatic recovery from node failures, jamming, and traffic congestion. Because it does not rely on base stations, root nodes or any central routing control authority, the architecture does not rely on constant communication with any given network component. Operational and performance features of the network are mission configurable, but these settings are non-volatile and can be preconfigured. Tactical security features may also be provided in the network, such as support for NSA Type-1 certified Harris SecNet11 radio cards, FIPS 140-2 certified encryption for administrative and Ethernet device communications, and compatibility with third-party encryption, authentication and intrusion detection systems. In an embodiment, proprietary amplification and filtering circuitry provides extended line-of-sight range at bandwidths of up to 11 Mbits per second, using radios conforming to the IEEE 802.11b standard. Preferably, per-hop latency is low.

While a preferred embodiment has been set forth above, those skilled in the art who have reviewed the present disclosure will readily appreciate that other embodiments can be realized within the scope of the invention. Therefore, the present invention should be construed as limited only by the appended claims.

What is claimed is:

1. A method for ensuring reliable and efficient packet delivery of data over highly mobile mesh networks, in which each network comprises two or more network nodes, in which each of said nodes contains at least one transceiver device and a processor that implements a data communications protocol to communicate data to other network devices in an ad-hoc network, and in which the data are divided into data packets, with each data packet being encoded with a protocol header that includes that packet's source address, destination, cost information, and data flags that indicate a type and other attributes of said each data packet, the method comprising:
   (a) maintaining, at each of said nodes, a bridge table with entries for all encountered nodes, routes for all known nodes, alternate routes for all known nodes, and flags for indicating nodes that are undiscovered;
   (b) encoding, in each data packet, source and destination nodes and a set of flags that encode packet features, the packet features comprising an indication of whether the packet is unrouteable, discovery, introduction, or mesh/client;
   (c) updating the bridge table based on successful and unsuccessful routing of the packets to both known and unknown nodes;
   (d) routing failed packets via a known alternate route; and
   (e) sending undeliverable packets back toward a source of the packets, when a route to the destination is not known, in an effort to both mark the failed route and to find an alternate route to the destination node device.

2. A method as in claim 1, wherein a discovery packet is a data packet with a discovery flag set, and further comprising:
   (f) when all alternate and known routes to a destination node have failed, changing unroutable flagged packets to discovery flagged packets and broadcasting the discovery flagged packets throughout the network, in an effort to find a new route to a new or formerly known destination node;
   (g) when a discovery flagged packet is received by a node that is not the destination for that packet, rebroadcasting the discovery packet from the node;
   (h) when a discovery flagged packet is received by a node that is the destination for that packet, sending another packet type from the node, an introduction packet, back to the source of the discovery packet and locally delivering the discovery packet as a normal data packet; and (i) when any node receives an introduction packet, updating the bridge table in that node based on the new routing information for the sender of that packet and, if the node is not the destination for that packet, relaying that packet toward the destination based on normal routing for that packet.

3. A method as in claim 1, wherein:

the processor at one of the nodes, if not the originator of the undeliverable packet, will check its bridge table for a stored alternate route to the destination;

given an alternate route, the packet is sent to the alternate address;

if successfully routed, the alternate route is updated to a primary route in the bridge table; and if unsuccessfully routed, the data packet is sent back toward the originator of the packet.

4. A method as in claim 1, wherein:

the processor at one of the nodes, if the originator of the undeliverable packet, will update the packet sequence number of the packet and mark it as a discovery packet; and the originator will then broadcast this packet to all nodes in range, in an attempt to find a route to the destination node.

5. A method as in claim 1, wherein:

if the processor at one of the nodes receives a broadcast discovery packet targeted to a non-local destination, the processor looks for the destination address in its bridge table;

if the destination address is found, the packet is sent to the destination device; and if the destination address is not found, the packet is rebroadcast to all nearby mesh network nodes.

6. A method as in claim 1, wherein, when the processor at one of the nodes receives a broadcast discovery packet targeted to a local destination, the processor sends an introduction packet back to the originator of the data packet and then delivers that data packet.

7. A method as in claim 1, wherein:

when the processor at one of the nodes receives an introduction packet, the processor updates its bridge tablet to reflect the good route to that node; and if that node is not the node originating the discovery packet that generated the introduction packet, the node sends the introduction packet back toward the originator.

8. A node for use in a highly mobile mesh network for ensuring reliable and efficient packet delivery of data over the highly mobile mesh network, in which each network comprises two or more of said nodes, said node comprising:

at least one transceiver device; and a processor that implements a data communications protocol to communicate data to other network devices in an ad-hoc network, and in which the data are divided into data packets, with each data packet being encoded with a protocol header that includes that packet's source address, destination, cost information, and data flags that indicate a type and other attributes of said each data packet, the processor being configured for:

(a) maintaining a bridge table with entries for all encountered nodes, routes for all known nodes, alternate routes for all known nodes, and flags for indicating nodes that are undiscovered;

(b) encoding, in each data packet, source and destination nodes and a set of flags that encode packet features, the packet features comprising an indication of whether the packet is unrouteable, discovery, introduction, or mesh/client;

(c) updating the bridge table based on successful and unsuccessful routing of the packets to both known and unknown nodes;

(d) routing failed packets via a known alternate route; and (e) sending undeliverable packets back toward a source of the packets, when a route to the destination is not known, in an effort to both mark the failed route and to find an alternate route to the destination node device.

9. A node as in claim 8, wherein a discovery packet is a data packet with a discovery flag set, and wherein the processor is further configured for:

(f) when all alternate and known routes to a destination node have failed, changing unroutable flagged packets to discovery flagged packets and broadcasting the discovery flagged packets throughout the network, in an effort to find a new route to a new or formerly known destination node;

(g) when a discovery flagged packet is received by a node that is not the destination for that packet, rebroadcasting the discovery packet from the node;

(h) when a discovery flagged packet is received by a node that is the destination for that packet, sending another packet type from the node, an introduction packet, back to the source of the discovery packet and locally delivering the discovery packet as a normal data packet; and (i) when any node receives an introduction packet, updating the bridge table in that node based on the new routing information for the sender of that packet and, if the node is not the destination for that packet, relaying that packet toward the destination based on normal routing for that packet.

10. A node as in claim 8, wherein the processor is further configured such that:

the processor, if not the originator of the undeliverable packet, will check its bridge table for a stored alternate route to the destination;

given an alternate route, the packet is sent to the alternate address;

if successfully routed, the alternate route is updated to a primary route in the bridge table; and if unsuccessfully routed, the data packet is sent back toward the originator of the packet.

11. A node as in claim 8, wherein the processor is further configured such that:

the processor, if the originator of the undeliverable packet, will update the packet sequence number of the packet and mark it as a discovery packet; and the originator will then broadcast this packet to all nodes in range, in an attempt to find a route to the destination node.

12. A node as in claim 8, wherein the processor is further configured such that:

if the processor at one of the nodes receives a broadcast discovery packet targeted to a non-local destination, the processor looks for the destination address in its bridge table;

if the destination address is found, the packet is sent to the destination device; and if the destination address is not found, the packet is rebroadcast to all nearby mesh network nodes.

13. A node as in claim 8, wherein the processor is further configured such that, when the processor at one of the nodes receives a broadcast discovery packet targeted to a local destination, the processor sends an introduction packet back to the originator of the data packet and then delivers that data packet.

14. A node as in claim 8, wherein the processor is further configured such that:
when the processor at one of the nodes receives an introduction packet, the processor updates its bridge tablet to reflect the good route to that node; and
if that node is not the node originating the discovery packet that generated the introduction packet, the node sends the introduction packet back toward the originator.

* * * * *